United States Patent
Exelmans et al.

(10) Patent No.: US 7,323,706 B2
(45) Date of Patent: Jan. 29, 2008

(54) METHOD OF ASSOCIATING META-DATA RELATING TO A RADIATION IMAGE OF AN OBJECT WITH THE RADIATION IMAGE

(75) Inventors: Walter Exelmans, Merksem (BE); Eric De Broeck, Zemst (BE); Peter Durt, Zoersel (BE); Patrick Lambrechts, Zoersel (BE); Bart Tytgat, Bonheiden (BE)

(73) Assignee: AGFA Healthcare, N.V., Mortsel (BE)

( * ) Notice: Subject to any disclaimer, the term of this patent is extended or adjusted under 35 U.S.C. 154(b) by 0 days.

(21) Appl. No.: 11/339,457

(22) Filed: Jan. 25, 2006

(65) Prior Publication Data

US 2006/0180776 A1  Aug. 17, 2006

Related U.S. Application Data

(60) Provisional application No. 60/673,964, filed on Apr. 22, 2005.

(30) Foreign Application Priority Data

Feb. 14, 2005  (EP) ................................. 05101073
Mar. 24, 2005  (EP) ................................. 05102394

(51) Int. Cl.
*A61B 6/00* (2006.01)
(52) U.S. Cl. ........................ 250/582; 250/395; 250/302
(58) Field of Classification Search ................ 250/582, 250/395, 307, 302
See application file for complete search history.

(56) References Cited

U.S. PATENT DOCUMENTS

| | | | |
|---|---|---|---|
| 4,383,329 A | | 5/1983 | Krobel et al. |
| 4,498,006 A | * | 2/1985 | Horikawa et al. ........... 250/584 |
| 4,739,480 A | * | 4/1988 | Oono et al. ................. 250/584 |
| 4,910,405 A | * | 3/1990 | Suzuki et al. ............... 250/368 |
| 5,596,202 A | * | 1/1997 | Arakawa .................. 250/484.4 |
| 2005/0209888 A1 | * | 9/2005 | Oowaki et al. ................. 705/3 |

* cited by examiner

*Primary Examiner*—David Porta
*Assistant Examiner*—Jessica L Eley
(74) *Attorney, Agent, or Firm*—Houston Eliseeva LLP

(57) ABSTRACT

A first time stamp T1 indicative of the time of irradiation of an object and a second time stamp T2 indicative of the time of exposure of an image detector by the radiation image of the object, are generated. Meta-data relating to the object are associated with the radiation image of the object if T1 equals T2 or if T1 approximates T2 within a predefined limit.

19 Claims, No Drawings

METHOD OF ASSOCIATING META-DATA RELATING TO A RADIATION IMAGE OF AN OBJECT WITH THE RADIATION IMAGE

This application claims the benefit of U.S. Provisional Application No. 60/673,964 filed Apr. 22, 2005, European Patent Application No. 05102394.3 filed Mar. 24, 2005, and European Patent Application No. 05101073.4 filed Feb. 14, 2005

FIELD OF THE INVENTION

The present invention relates to radiography.

The invention more particularly relates to a method for associating meta data such as identification data of a patient and/or data relating to high energy radiation exposure with data representing a radiation image.

BACKGROUND OF THE INVENTION

In addition to classical radiography systems in which a radiographic image of a patient is recorded on film, computed radiography systems and digital radiography systems are nowadays commonly used.

Computed radiography systems are for example systems that are based on storage phosphor technology.

Digital radiography systems are systems in which a radiation image is recorded on a flat panel detector such as a CMOS, a Selenium detector or the like.

In systems in which imaging is obtained by irradiation of a patient, an animal or an object with high energy radiation, it is important that the image and the meta-data giving information pertaining to the image are linked.

Meta-data are all kinds of data to be associated with the image such as demographic data (patient name, gender, date of birth etc.) and data relating to the exposure such as mAs, kV, exposure type, exposure view etc.

For example in a computed radiography system in which a radiographic image of a patient is recorded on a photo-stimulabale phosphor screen which is conveyed in a cassette, the meta-data are entered in a workstation or retrieved from a hospital information system or a radiology information system and transferred onto an identification means which is coupled to the cassette. Meta-data can be written into a non-volatile device for example an EEPROM device which is provided on the cassette conveying the exposed phosphor screen or the data can be transferred through radio-frequency transmission onto a radio-frequency tag provided on the cassette or on the screen.

The identified cassette conveying an exposed photo-stimulable phosphor screen is then fed into a read out apparatus (also referred to as a 'digitizer') where the meta-data are read from the identification means and where the radiographic image which is stored in the phosphor screen is read out. The radiographic image is read out by scanning the exposed photo-stimulable phosphor screen with stimulating radiation and by converting the image-wise modulated light which is emitted by the screen upon stimulation into a digital signal representation of the radiographic image.

The above-described procedure is error prone since identification and exposure are performed separate from each other so that it is possible that meta data relating to a patient and associated exposure are written into the memory device of a cassette which carries a radiation image that does not correspond with these meta data.

It is also possible that the data which are written into the memory device on the cassette correspond with the intended circumstances, for example the intended or default settings of the X-ray source but which, due to various possible circumstances do not exactly represent the effectively applied exposure.

Furthermore, the prior art method bears the risk of non-intended double exposure of a cassette conveying a photo-stimulable phosphor screen.

It is an object of the present invention to provide a method that overcomes the above-mentioned problems associated with the prior art workflow.

SUMMARY OF THE INVENTION

A first time stamp T1 indicative of the time of irradiation of an object and a second time stamp T2 indicative of the time of exposure of an image detector by the radiation image of the object, are generated. Meta-data relating to the object are associated with the radiation image of the object if T1 equals T2 or if T1 approximates T2 within a predefined limit.

Further advantages and embodiments of the present invention will become apparent from the following description.

DETAILED DESCRIPTION OF THE PREFERRED EMBODIMENTS

The present invention is described below with reference to a computed radiography system in which a radiation image of a patient is recorded on a photostimulable phosphor screen which is conveyed in a cassette. The cassette or the screen is provided with a memory device in which a time stamp T2, indicative of the time of exposure of the photo-stimulable phosphor screen is stored. The time stamp T2 is generated by means of one of the methods described further on.

Prior to exposure of the object to radiation, so-called meta data regarding the object to be irradiated and/or to the exposure procedure are generated and stored in an identification station.

These meta data are data concerning the patient such as the patient's identification as well as data concerning the exposure to be performed such as exposure settings.

These data are for example input at the console of an identification station. Alternatively the data can be retrieved from a radiology information system.

The identification station may be coupled to the source of radiation so that the meta data can be used to control and/or initiate activation of the radiation generator (in most cases complemented by a manual interaction of an operator).

According to the present invention a time stamp T1 indicative of the time of exposure (i.e. at which irradiation of the object is started) or a time-related code indicative of the time of exposure is stored in the memory of the identification station together with the meta data.

The identification station can be informed of the time of the actual exposure in various ways. The time stamp or code, indicative of the time of actual exposure, can be communicated to the identification station via wireless or wired communication between the source of radiation and the identification station.

The time stamp may represent an absolute moment of time or a relative moment of time.

A code indicative of the actual time of exposure can for example be in the form of encrypted data associated with the time of their creation.

In another embodiment a radiation detector may be provided in the exposure room for detecting the time when irradiation takes place, the detector being coupled in a wired or wireless way with the identification station for communication of this time stamp to the identification station.

Next the exposure procedure is performed. A radiation image of an object is recorded on the photostimulable phosphor screen.

At the time of exposure a second time stamp T2 is generated. This second time stamp, indicative of the time at which the photostimulable phosphor screen is exposed to high energy radiation, is generated by one of the methods described below. This time stamp T2 is stored in a memory device associated with the cassette or the phosphor screen.

Next, the cassette carrying the exposed photostimulable phosphor screen is fed for read out into a so-called digitizing apparatus.

The data stored in the memory device on the cassette or on the screen are read out, these data make up the time stamp T2.

From the identification station which is coupled to the digitizer, the stored meta data are retrieved with which a time stamp T1 is associated that differs less than a predetermined amount from time stamp T2.

The predetermined amount can be preset by the operator. For a single image a typical value for T2 is 200 msec.

In a preferred embodiment T1 is equal to T2.

In case of a full leg or full spine application more than one partial image of the leg or the spine are generated within a corresponding T2.

In case of the recording of multiple images on a single recording material, the time stamp T2 is preferably associated with the first of said images. In this case there are multiple detectors on the screen, each detector can separately be associated with a time stamp. This allows to identify multiple images recorded on a single detector.

The photostimulable phosphor screen is read out in the digitizing apparatus.

Adjustment values for the digitizing apparatus are deduced from the retrieved meta data.

The exposed phosphor screen is subjected to two-dimensional scanning by means of a light beam. Upon scanning the exposed screen emits image-wise modulated light. This image-wise modulated light is collected and converted into an electric signal representation of the radiation image. The electric signal representation can then be applied to an image processing unit for further processing and/or can be applied to a hard copy recorder or to a display or archive station.

Below several methods and implementations are described for generating a time stamp T2 indicative of the time at which the detector is exposed to radiation.

In a first series of embodiments the time stamp T2 is generated in response to detection of the secondary emission of radiation emitted by the irradiated object, in this case, the patient.

In all embodiments which fall under this category, secondary radiation emission emitted by the exposed object is guided to a transducer where the secondary emission is converted into a corresponding electric signal. An example of a suitable transducer is a PIN diode provided with a luminescent phosphor.

The electric signal is used to trigger a clock to produce a clock signal indicated as T2. This time stamp is stored in a memory device which can be provided e.g. on the photostimulable phosphor screen itself or on the cassette conveying the phosphor screen.

Still alternative embodiments maybe envisaged.

Collection and guidance of the secondary emission towards the transducer may be implemented in different ways.

For example a scintillating fiber covered with a phosphor layer may be provided for collecting the secondary emission, converting it into light and directing it towards a transducer.

In an alternative embodiment the secondary emission by the image detector (instead of the exposed object) e.g. in the form of light is collected and guided to a transducer such as a PIN diode.

The PIN diode may be provided with a phosphor layer converting radiation into light which is then converted into an electric signal. In this embodiment the PIN diode performs a direct and an indirect conversion.

The PIN diode may be positioned with the backside or the frontside towards the radiation.

Different embodiments of radiation collecting and guidance means may be envisaged such as a light guiding fiber which can be arranged around the image detector or a light guiding platen assembly that collects light and guides it towards an output end.

In another category of embodiments, the time stamp T2 corresponds to the time of detection of high energy radiation instead of detection of secondary emission. In this case the time of detection of the radiation that produces the radiation image of the object is used for generating the time stamp T2.

The following embodiments may be envisaged.

Detection of high energy radiation may be performed by an array of (at least one) transducer preferably arranged at the back side of the photostimulable phosphor screen so that no image of the transducers is formed on the detector. By the terms 'back of the detector' is meant the side of the detector opposite to the side facing the irradiation source.

Alternatively at least one doped fiber may be arranged at the back side of photostimulable phosphor screen. The doped fiber converts the high energetic radiation into light and transport the light to the transducer.

A doped fiber at least partially covered with a phosphor layer may be provided around or on top of the phosphor screen to capture the generated light and to transport the light to a PIN diode provided at an outer end(s) of the fiber.

Still alternatively a transducer foil such as a foil of solar cells may be provided at the back side of the image detector.

In still another category of embodiments EMI waves present in the radiology room are used to put via wireless radio transmitters a time stamp T2 in the memory device coupled to the cassette carrying the radiation detector.

In still another category of embodiments a human interface is used to trigger the generation of the time stamp T2. A manual trigger may be implemented in various ways, e.g. touch or press sensitive switch, transmitter etc.)

Although the present invention has been described with reference to an embodiment in which a radiation image is recorded on a photostimulable phosphor screen, it is to be understood that the invention is not limited to this embodiment. The invention is for example like-wise applicable to an embodiment in which the detector is a digital detector such as CMOS detector.

A specific problem occurs in a situation in which image detectors that have been exposed in different radiography rooms are read out by means of the same digitizer coupled to the same identification device.

In this case the exposed detectors and the corresponding time stamps T2 might be associated with the same time stamp T1. In this way an image stored in a detector might be associated with meta data relating to another image stored on another detector.

A solution to this problem can be provided by storing information identifying the radiology room in a memory device coupled to the image detector or coupled to a cassette conveying the image detector.

A writing device can be coupled to the source of radiation for wire-less writing, e.g. via infrared radiation, of information identifying the radiology room onto the cassette conveying the photostimulable phosphor screen or onto the screen itself.

This feature can also be implemented so that the data identifying the radiology room are only accepted by unexposed cassettes.

It is also possible to use cassettes that belong to a specific room, the room information being permanent available on the cassette.

Alternatively a unique number can be written onto the cassette, the number being a reference for a specific procedure. Since every image belongs to a single procedure, this makes it unique.

Cassettes carrying a radiation detector may also be provided with an external display unit that is coupled to the arrangement which produces the time stamp T2. This arrangement can then be set up to control display of an indication of the cassette's condition, i.e. carrying an exposed or non-exposed photostimulable phosphor screen.

In a specific embodiment this display device is arranged to display a warning that the cassette and the enclosed image detector have to be erased prior to exposure, e.g. when the cassette has been unused for a certain amount of time so that rebounce effects might have taken place.

The invention claimed is:

1. Method of associating meta-data regarding a radiation exposure of an object with a radiation image comprising the steps of:
   generating meta data pertaining to a radiation exposure of an object,
   performing said exposure to generate a radiation image of said object and generating a first time stamp T1 indicative of the time of x-ray radiation exposure of the object,
   detecting said radiation image with an x-ray radiation image detector and generating a second time stamp T2 indicative of the time of the detection of x-rays by the x-ray radiation image detector, and
   combining said meta data with the detected radiation image if T1 approximates T2 within a predefined limit.

2. Method according to claim 1 wherein T1 equals T2.

3. Method according to claim 1 wherein said time stamp T1 is communicated to an identification station.

4. Method according to claim 1 wherein T2 is the time of detection of secondary emission of radiation emitted by an irradiated object.

5. Method according to claim 4 wherein T2 is obtained by triggering a clock with an electric signal produced by a transducer being irradiated by said secondary emission.

6. Method according to claim 5 wherein said secondary emission is collected and guided to said transducer by a scintillating fiber covered with a phosphor layer.

7. Method according to claim 1 wherein said time stamp T2 is the time of detection of secondary emission generated by said image detector.

8. Method according to claim 7 wherein T2 is obtained by triggering a clock with an electric signal produced by a transducer being irradiated by said secondary emission.

9. Method according to claim 8 wherein said secondary emission is collected and guided by means of a light guiding fiber.

10. Method according to claim 8 wherein said secondary emission is collected and guided by means of a light guiding plan parallel platen assembly.

11. Method according to claim 1 wherein said time stamp T2 is the time of detection of high energy radiation by said radiation detector.

12. Method according to claim 11 wherein said high energy radiation is detected by an array of transducers arranged at the side of said image detector opposite to the side facing the source of radiation.

13. Method according to claim 11 wherein said high energy radiation is collected and guided by a doped fiber arranged at the side of the detector opposite to the side facing the source of radiation.

14. Method according to claim 1 wherein T2 corresponds to the time of detection of EMI waves.

15. Method according to claim 1 wherein said image detector comprises a photostimulable phosphor screen and wherein said radiation image is readout of said photostimulable phosphor screen in a digitizing apparatus arranged to retrieve meta data associated with said radiation image from an identification station.

16. Method according to claim 1 wherein data identifying a radiology room are written into a memory device coupled to said image detector.

17. Method according to claim 1 wherein an indication of an exposure condition of the image detector is displayed.

18. Method of storing meta-data regarding a radiation exposure of an object with a radiation image comprising the steps of:
   generating meta data pertaining to a radiation exposure of an object,
   performing said exposure to generate a radiation image of said object and generating a first time stamp T1 indicative of the time of x-ray radiation exposure of the object,
   detecting said radiation image with an x-ray radiation image detector and generating a second time stamp T2 indicative of the time of the detection by the x-ray radiation image detector, and
   storing said meta data with the detected radiation image if T1 approximates T2 within a predefined limit.

19. Method according to claim 18 further comprising storing T1 in an identification station and storing T2 in a cassette holding a phosphor screen.

* * * * *